(12) United States Patent
Mochizuki et al.

(10) Patent No.: US 10,088,007 B2
(45) Date of Patent: Oct. 2, 2018

(54) JOINT STRUCTURE AND HYDRAULIC SHOCK ABSORBER

(75) Inventors: Takahisa Mochizuki, Kani (JP); Yuuki Amano, Kakamigahara (JP)

(73) Assignee: KYB Corporation, Tokyo (JP)

( * ) Notice: Subject to any disclaimer, the term of this patent is extended or adjusted under 35 U.S.C. 154(b) by 575 days.

(21) Appl. No.: 13/701,373

(22) PCT Filed: May 27, 2011

(86) PCT No.: PCT/JP2011/062253
§ 371 (c)(1),
(2), (4) Date: Nov. 30, 2012

(87) PCT Pub. No.: WO2011/152317
PCT Pub. Date: Dec. 8, 2011

(65) Prior Publication Data
US 2013/0068575 A1    Mar. 21, 2013

(30) Foreign Application Priority Data
Jun. 1, 2010  (JP) ................... 2010-125687

(51) Int. Cl.
*F16F 9/14* (2006.01)
*F16D 1/10* (2006.01)
*F16D 1/02* (2006.01)

(52) U.S. Cl.
CPC ........... *F16F 9/14* (2013.01); *F16D 1/02* (2013.01); *F16D 1/101* (2013.01); *Y10T 403/70* (2015.01)

(58) Field of Classification Search
CPC .... F16F 9/34; F16F 9/486; F16F 9/466; F16F 9/3221; F16F 9/50; F16F 9/14
USPC ............................. 188/322.15, 289
See application file for complete search history.

(56) References Cited

U.S. PATENT DOCUMENTS

| 5,139,119 A | * | 8/1992 | Karnopp ............. 188/266.3 |
| 5,305,860 A | * | 4/1994 | Rotharmel et al. ...... 188/266.2 |
| 5,680,913 A | * | 10/1997 | Wood ................. 188/285 |
| 2009/0003930 A1 | | 1/2009 | Horen et al. |
| 2010/0294605 A1 | | 11/2010 | Mochizuki |

FOREIGN PATENT DOCUMENTS

| FR | 2621663 A1 * | 4/1989 | ........ B60G 13/08 |
| FR | 2785960 A1 | 5/2000 | |
| JP | 1990-7179 U | 1/1990 | |
| JP | 05-280546 A | 10/1993 | |

(Continued)

*Primary Examiner* — Xuan Lan Nguyen
(74) *Attorney, Agent, or Firm* — Rabin & Berdo, P.C.

(57) ABSTRACT

In a joint structure for joining an insertion shaft that is driven to rotate to a reception side shaft having an insertion groove into which the insertion shaft is inserted so that a rotation of the insertion shaft is transmitted to the reception side shaft, a plurality of pairs of opposing side face portions are formed on an outer periphery of the insertion shaft, the insertion groove includes an axial hole that is formed to open onto an end surface of the reception side shaft and coincides with a pair of first side face portions of the side face portions, and a radial hole that is formed to penetrate the reception side shaft in a radial direction and coincides with a pair of second side face portions of the side face portions, and the axial hole and the radial hole are formed such that respective parts thereof intersect.

10 Claims, 5 Drawing Sheets

(56) References Cited

FOREIGN PATENT DOCUMENTS

| | | | |
|---|---|---|---|
| JP | 8-183488 A | 7/1996 | |
| JP | 11-332894 A | 12/1999 | |
| JP | 2000-103338 A | 4/2000 | |
| JP | 2002161939 * | 6/2002 | ............... F16F 9/44 |
| JP | 2010-084925 A | 4/2010 | |

* cited by examiner

JOINT STRUCTURE AND HYDRAULIC SHOCK ABSORBER

The contents of application No. 2010-125687, with a filing date of Jun. 1, 2010 in Japan, are incorporated herein by reference.

TECHNICAL FIELD

This invention relates to a joint structure used to join an insertion shaft that is driven to rotate and a reception side shaft to which a rotation of the insertion shaft is transmitted, and a hydraulic shock absorber to which the joint structure is applied.

BACKGROUND ART

A joint structure for joining an insertion shaft and a reception side shaft may be realized by damping force adjusting means provided in a shock absorber of a suspension device such as a front fork or a rear cushion unit, for example.

JP08-183488A discloses damping force adjusting means for a rear cushion unit that suspends a rear wheel of a motorcycle in order to damp road surface vibration input into the rear wheel.

The rear cushion unit disclosed in JP08-183488A is constituted by a suspension spring that absorbs the road surface vibration and a damper device that damps an expansion/contraction motion of the rear cushion unit accompanying absorption of the road surface vibration.

The damper device includes a cylinder housing a working fluid, a rod that advances and retreats through the cylinder, a piston that is held on the rod so as to delimit an interior of the cylinder into an expansion side chamber and a contraction side chamber, and a reservoir tank that is provided on an exterior of the cylinder so as to communicate with the contraction side chamber and compensates for variation in an internal volume of the cylinder occurring as the rod advances and retreats through the cylinder.

A connecting passage that connects the contraction side chamber to the reservoir tank is closed by a base member. The base member includes an expansion side port and a contraction side port that connect the contraction side chamber to the reservoir tank. An expansion side check valve that allows the working fluid to flow only from the reservoir tank into the contraction side chamber is provided in the expansion side port. A contraction side damping force generating valve that allows the working fluid to flow only from the contraction side chamber into the reservoir tank and generates a predetermined damping force at that time is provided in the contraction side port. The damper device also includes damping force adjusting means for adjusting the damping force. The damping force adjusting means includes a bypass passage that connects the contraction side chamber to the reservoir tank without passing through the contraction side damping force generating valve, a needle valve that modifies an opening amount of the bypass passage, and an adjuster that drives the needle valve.

The opening amount of the bypass passage is modified by operating the adjuster to rotate such that a pointed end portion of the needle valve advances and retreats through the bypass passage. Accordingly, a flow rate of the working fluid passing through the contraction side damping force generating valve is modified, and as a result, the damping force is adjusted.

In JP08-183488A, a joint structure is used to join the needle valve to the adjuster. The joint structure is constituted by a projection formed on one end of the adjuster and having a pair of opposing planar portions, and a latch hole formed in a back surface of the needle valve, into which the projection formed on the adjuster is inserted to be capable of advancing and retreating. The needle valve is disposed in and screwed to a tubular needle sliding hole, and during the rotary operation of the adjuster, the needle valve rotates so as to move through the needle sliding hole in an axial direction.

SUMMARY OF THE INVENTION

In the joint structure disclosed in JP08-183488A, the projection on the adjuster is sandwiched by the latch hole in the needle valve, and therefore, although axial direction movement of the projection is restricted, radial direction movement is not. As a result, rattling may occur when the needle valve is driven by the rotary operation of the adjuster.

When the adjuster and the needle valve are joined using a spline joint in order to prevent this rattling, processing becomes complicated.

This invention has been designed in consideration of the problems described above, and an object thereof is to provide a simply structured joint structure that prevents rattling between an insertion shaft and a reception side shaft.

This invention is a joint structure for joining an insertion shaft that is driven to rotate to a reception side shaft having an insertion groove into which the insertion shaft is inserted so that a rotation of the insertion shaft is transmitted to the reception side shaft, wherein a plurality of pairs of opposing side face portions are formed on an outer periphery of the insertion shaft. The insertion groove comprises an axial hole that is formed to open onto an end surface of the reception side shaft and coincides with a pair of first side face portions of the side face portions, and a radial hole that is formed to penetrate the reception side shaft in a radial direction and coincides with a pair of second side face portions of the side face portions, and the axial hole and the radial hole are formed such that respective parts thereof intersect.

EMBODIMENTS OF THE INVENTION

An embodiment of this invention will be described below with reference to the figures.

First, referring to FIG. 1, a front fork 100 to which a joint structure according to an embodiment of this invention is applied will be described.

The front fork 100 is interposed between a vehicle body and a vehicle axle on a front wheel side of a motorcycle, and functions as a hydraulic shock absorber that suppresses variation in an attitude of the vehicle body by absorbing road surface vibration input into the front wheel.

The front fork 100 includes a fork main body constituted by an outer tube 1 serving as a vehicle body side tube and an inner tube 2 serving as a vehicle wheel side tube inserted into the outer tube 1 to be free to slide. The fork main body is provided in a pair on both side of the front wheel, and corresponds to an expansion/contraction member according to this invention.

The outer tube 1 is coupled to the vehicle body side via a vehicle body side bracket, and the inner tube 2 is coupled to the vehicle wheel side via a vehicle wheel side bracket, and in this condition, the fork main body performs a telescopic expansion/contraction operation. An upper end portion of the fork main body is sealed by a cap member 10, and a lower end portion is sealed by a bottom member 20.

An upright damper 3 that generates damping force during the expansion/contraction operation of the fork main body and a suspension spring 6 serving as a biasing member that biases the fork main body in an expansion direction are provided in an interior of the fork main body. The front fork 100 uses the suspension spring 6 to absorb an impact input into the front wheel due to an irregularity on a road surface, and uses the damper 3 to damp the expansion/contraction operation of the fork main body accompanying absorption of the impact.

A reservoir chamber 8 is formed in a space defined by the outer tube 1 and the inner tube 2, or in other words on an exterior of the damper 3. Working oil (a working fluid) is sealed into the reservoir chamber 8, and a gas chamber 8a is formed above a liquid level of the working oil. Thus, a part of the reservoir chamber 8 is filled with gas.

The damper 3 includes a cylinder 30 that is supported by the bottom member 20 so as to stand upright coaxially with the inner tube 2, a piston 32 disposed in the cylinder 30 to be free to slide, a rod 31 formed such that a base end side thereof extends to an exterior of the cylinder 30 and is fixed to the outer tube 1 and the piston 32 is fixed to a tip end side thereof, and a base member 33 fixed to a bottom portion side of the cylinder 30.

Working oil is sealed into the cylinder 30. An interior of the cylinder 30 is delimited by the piston 32 into an expansion side chamber 30a positioned on the rod side and a contraction side chamber 30b positioned on the piston side. The base member 33 separates the contraction side chamber 30b from the reservoir chamber 8.

The rod 31 is fixed to the outer tube 1 via the cap member 10. More specifically, a base end portion is screwed to a rod holding portion 11 of the cap member 10 and locked by a nut 36. The rod 31 moves while being guided by an annular rod guide 34 screwed to an upper end opening portion of the cylinder 30. A tip end member 35 that supports the piston 32 is screwed fixedly to a tip end portion of the rod 31.

An expansion side port 32a and a contraction side port (not shown) that connect the expansion side chamber 30a to the contraction side chamber 30b are formed in the piston 32. An annular leaf valve 32b serving as an expansion side damping force generation portion is provided in a contraction side chamber 30b side opening portion of the expansion side port 32a. A contraction side check valve 32c that allows the working oil to flow only from the contraction side chamber 30b into the expansion side chamber 30a is provided in the contraction side port.

The leaf valve 32b is disposed in laminated fashion on a contraction side chamber 30b side end surface of the piston 32 in order to open and close the expansion side port 32a in accordance with a differential pressure between the expansion side chamber 30a and the contraction side chamber 30b. More specifically, when the fork main body performs an expansion operation such that a pressure in the expansion side chamber 30a rises, causing the differential pressure between the expansion side chamber 30a and the contraction side chamber 30b to reach a predetermined value, an outer peripheral side of the leaf valve 32b deforms, thereby opening a downstream side opening portion of the expansion side port 32a. When the expansion side port 32a opens, the working oil in the expansion side chamber 30a flows into the contraction side chamber 30b through the expansion side port 32a. The leaf valve 32b generates a predetermined pressure loss by applying resistance to the working oil passing through the expansion side port 32a. As a result, an expansion side damping force is generated. The contraction side check valve 32c, meanwhile, maintains the contraction side port in a closed condition during the expansion operation of the fork main body.

When the fork main body performs a contraction operation, the leaf valve 32b is pressed against the piston 32 by a pressure of the working oil in the pressurized contraction side chamber 30b, and as a result, the expansion side port 32a is closed. The contraction side check valve 32c, meanwhile, is pushed open by a pressure of the working oil in the contraction side chamber 30b, and as a result, the working oil in the contraction side chamber 30b is led into the expansion side chamber 30a without resistance.

The base member 33 includes an expansion side port 33a and a contraction side port (not shown) that connect the contraction side chamber 30b to the reservoir chamber 8. An expansion side check valve 33b that allows the working oil to flow only from the reservoir chamber 8 into the contraction side chamber 30b is provided in the expansion side port 33a. A contraction side check valve (not shown) that allows the working oil to flow only from the contraction side chamber 30b into the reservoir chamber 8 is provided in the contraction side port.

The expansion side check valve 33b opens during the expansion operation of the fork main body, whereby working oil is led into the contraction side chamber 30b from the reservoir chamber 8 in an amount corresponding to a shortage of working oil in the cylinder 30 as the rod 31 retreats. The contraction side check valve, meanwhile, opens during a contraction operation of the fork main body, whereby surplus working oil in the cylinder 30 is led into the reservoir chamber 8 from the contraction side chamber 30b as the rod 31 advances.

As described above, the fork main body shown in FIG. 1 functions as an expansion side fork main body that generates damping force during the expansion operation, and constitutes the front fork 100 in a pair with a contraction side fork main body (not shown) that generates damping force during the contraction operation. The contraction side fork main body is constructed by replacing the contraction side check valve provided in the contraction side port of the base member 33 shown in FIG. 1 with a leaf valve that generates damping force when the working oil passes through, and replacing the leaf valve 32b provided in the expansion side port 32a of the piston 32 with a check valve that allows the working oil to flow only from the expansion side chamber 30a into the contraction side chamber 30b.

Figure 1:
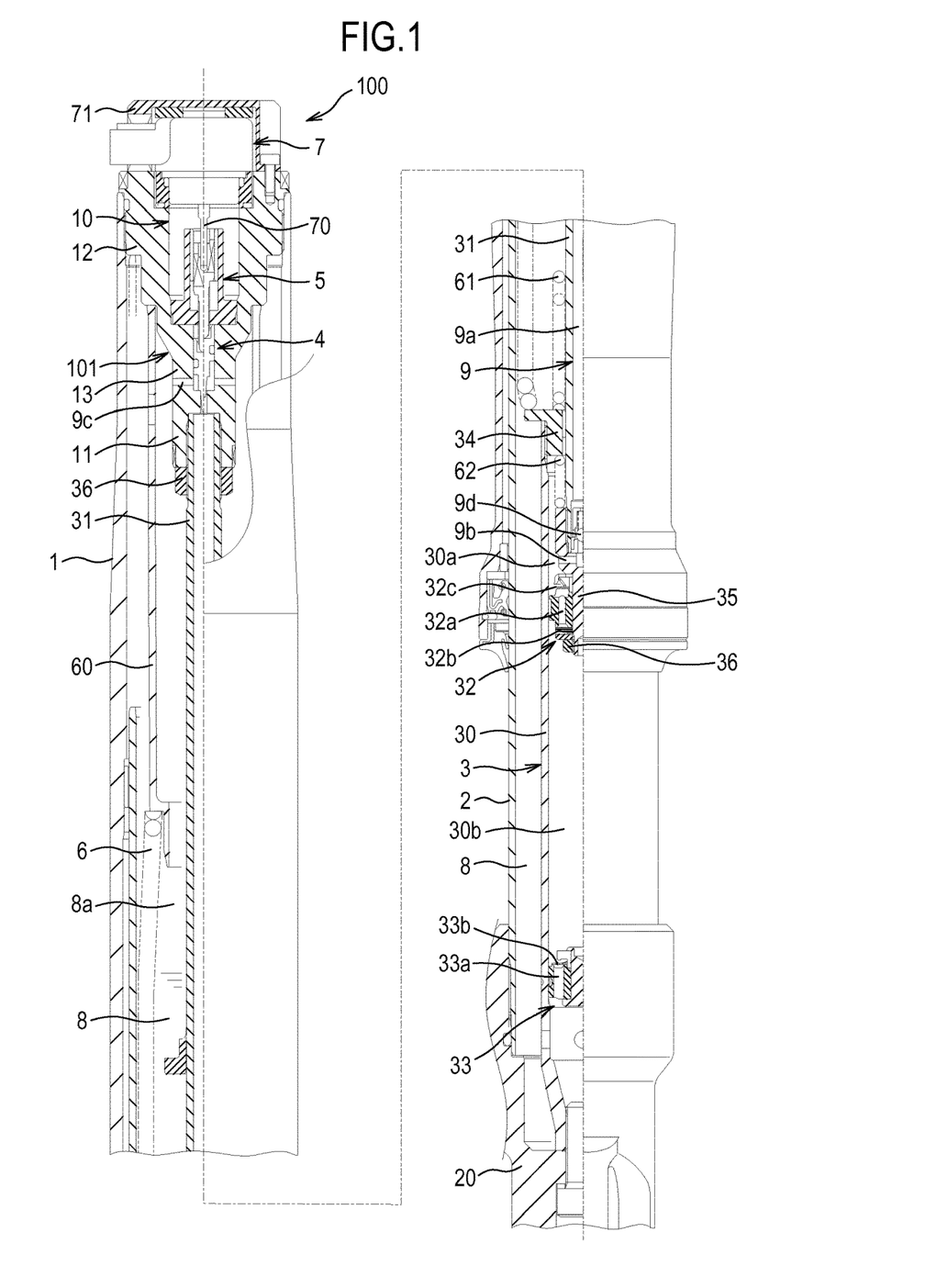
FIG. 1 is a partially cutout side view showing a front fork including a joint structure according to an embodiment of this invention.

Further, by replacing the contraction side check valve provided in the contraction side port of the base member 33 with a leaf valve that generates damping force when the working oil passes through in the fork main body shown in FIG. 1, a fork main body that generates damping force during both the expansion operation and the contraction operation can be constructed. In this case, the front fork 100 is constituted by a pair of fork main bodies that generate damping force during both the expansion operation and the contraction operation.

The damping force generation portion that generates the expansion side and contraction side damping force may employ a known conventional configuration and is not limited to the configuration described above.

The suspension spring 6 is interposed between a tubular spring bearing 60 fixed to the cap member 10 and the rod guide 34 in order to bias the fork main body in the expansion direction.

Rebound springs 61 and 62 are provided respectively in an upper end portion and a lower end portion of the rod guide 34 so as to surround the rod 31. The rebound springs 61 and 62 respectively absorb impacts generated when the front fork 100 is maximally contracted and maximally expanded.

The front fork 100 includes a damping force adjustment mechanism 101 that adjusts the damping force generated by the damper 3. The damping force adjustment mechanism 101 includes a bypass passage 9 that bypasses the expansion side port 32a of the piston 32, a needle valve 4 provided in the bypass passage 9, an adjuster 5 that adjusts an opening of the needle valve 4, and an actuator 7 that drives the adjuster 5.

The joint structure according to this embodiment is used to join the adjuster 5 to a shaft 70 of the actuator 7.

The bypass passage 9 is constituted by a rod interior passage 9a that penetrates an axial center of the rod 31, a first connecting passage 9b formed in the tip end member 35 to connect the rod interior passage 9a to the expansion side chamber 30a, and a second connecting passage 9c formed in the cap member 10 to connect the rod interior passage 9a to the reservoir chamber 8. Thus, the bypass passage 9 is configured to bypass the leaf valve 32b. A check valve 9d that allows the working oil to flow only from the expansion side chamber 30a into the reservoir chamber 8 is provided in the bypass passage 9.

During the expansion operation of the fork main body, the working oil in the pressurized expansion side chamber 30a presses against the leaf valve 32b and pushes open the check valve 9d in the bypass passage 9. As a result, a part of the working oil in the expansion side chamber 30a flows into the reservoir chamber 8 through the bypass passage 9. A flow rate of the working oil that flows into the reservoir chamber 8 through the bypass passage 9 is modified in accordance with the opening of the needle valve 4. Hence, by adjusting the opening of the needle valve 4 to modify the flow rate of the working oil passing through the leaf valve 32b, the expansion side damping force generated by the front fork 100 can be adjusted.

In the case of the contraction side fork main body that generates damping force during the contraction operation, the contraction side damping force can be adjusted by constructing the bypass passage 9 to connect the contraction side chamber 30b to the reservoir chamber 8. More specifically, a connecting passage that connects the rod interior passage 9a to the contraction side chamber 30b should be formed in the tip end member 35 in place of the first connecting passage 9b.

Figure 2:
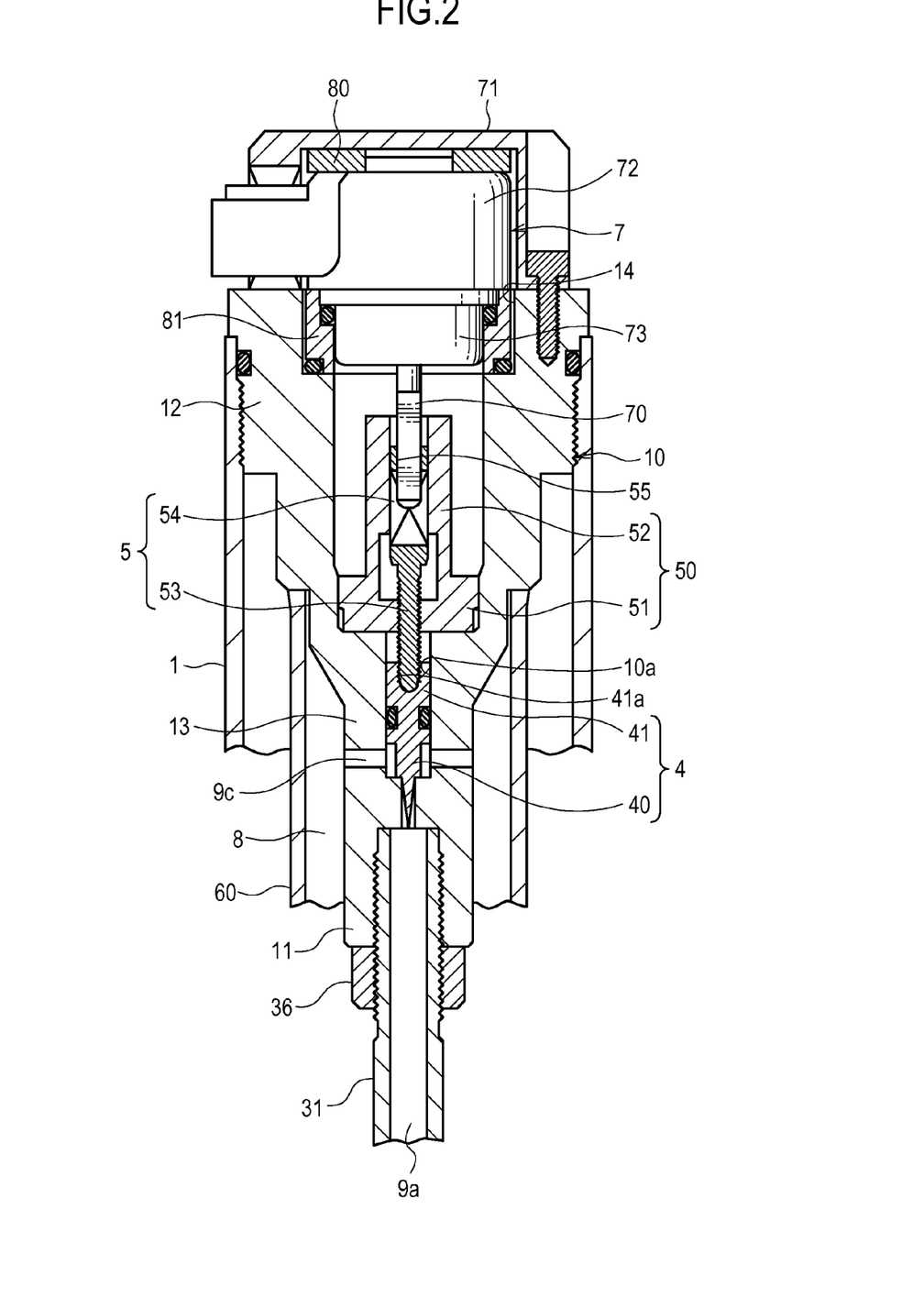
FIG. 2 is a longitudinal sectional view showing the vicinity of a needle valve in the front fork including the joint structure according to an embodiment of this invention.

As shown in FIG. 2, the needle valve 4 includes a valve portion 40 that sets an opening area of the bypass passage 9, or more specifically an opening area between the rod interior passage 9a and the second connecting passage 9c, and a coupling portion 41 that is provided to extend from a base end side of the valve portion 40 and disposed to be free to move within a hollow portion 10a penetrating an axial center of the cap member 10. The coupling portion 41 is coupled to the adjuster 5. A screw hole 41a into which a bolt portion 53 of the adjuster 5 is inserted and screwed is formed in a back surface of the coupling portion 41.

The cap member 10 includes a cap main body portion 12, an outer periphery of which contacts an inner periphery of the outer tube 1 closely via a seal, a needle valve holding portion 13 provided to extend from the cap main body portion 12 to the rod 31 side and formed with the hollow portion 10a, and the rod holding portion 11, which is provided to extend from the needle valve holding portion 13 to the rod 31 side, and which holds the rod 31. A screw hole is formed in the rod holding portion 11, and by screwing a screw portion formed on an outer periphery of the rod 31 into the screw hole, the rod 31 is held by the rod holding portion 11.

The needle valve 4 moves in the axial direction as the adjuster 5 moves, and a pointed end portion of the valve portion 40 modifies the opening area between the rod interior passage 9a and the second connecting passage 9c in accordance with a movement amount. As a result, the flow rate of the working oil passing through the bypass passage 9 is modified.

When the needle valve 4 advances such that the opening area of the bypass passage 9 decreases, the flow rate of the working oil passing through the leaf valve 32b increases, leading to an increase in the damping force generated by the leaf valve 32b. When the needle valve 4 retreats such that the opening area of the bypass passage 9 increases, on the other hand, the flow rate of the working oil passing through the leaf valve 32b decreases, leading to a reduction in the damping force generated by the leaf valve 32b.

The above configuration of the needle valve 4 for adjusting the opening area of the bypass passage 9 may be used for both the expansion side fork main body and the contraction side fork main body.

Next, referring to FIGS. 2 to 5, the joint structure that joins the shaft 70, which serves as an insertion shaft that is driven to rotate by the actuator 7, to the adjuster 5, which serves as a reception side shaft having an insertion groove 55 into which the shaft 70 is inserted, such that a rotation of the shaft 70 is transmitted to the adjuster 5 will be described in detail.

Figure 3:
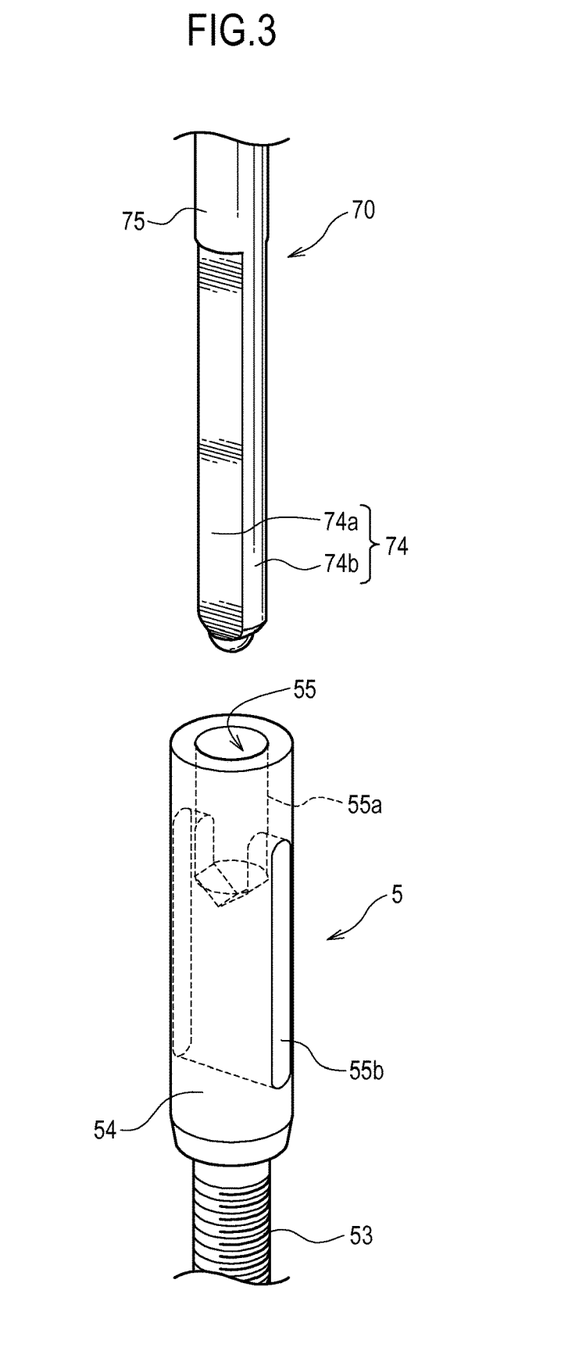
FIG. 3 is a perspective view of the joint structure according to an embodiment of this invention.

As shown in FIG. 3, an insertion portion 74 inserted into the insertion groove 55 of the adjuster 5 is formed on an outer periphery of a tip end side of the shaft 70. The shaft 70 is constituted by a base end side base portion 75, and the insertion portion 74 that extends from the base portion 75 coaxially therewith.

As shown in FIG. 5, the insertion portion 74 is constituted by planar side faces 74a (first side face portions) forming a pair of opposing planar portions, and arc-shaped side faces 74b (second side face portions) forming a pair of opposing arc portions. Thus, the insertion portion 74 is constituted by a plurality of pairs of opposing side face portions.

The pair of planar side faces 74a are formed width-across-flat. The pair of arc-shaped side faces 74b are formed to connect respective end portions of the pair of planar side faces 74a, and formed on an identical circumference each other.

As shown in FIG. 2, the adjuster 5 is held to be capable of moving in the axial direction by an adjuster case 50 fixed to the needle valve holding portion 13 of the cap member 10.

The adjuster case 50 is constituted by a base portion 51 that is press-fitted into an inner periphery of the hollow portion in the needle valve holding portion 13, and a tubular adjuster holding portion 52 that extends to the actuator 7 side from the base portion 51.

Figure 4A:
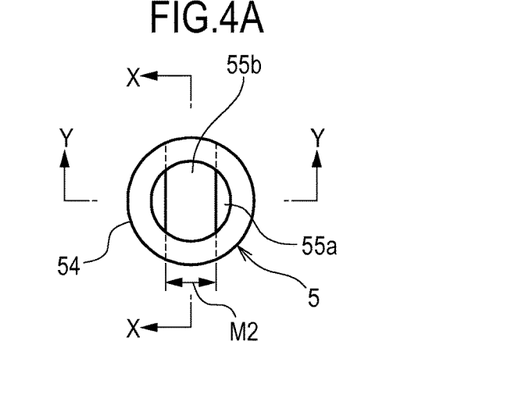
FIG. 4A is a plan view showing an adjuster of the joint structure according to an embodiment of this invention.
Figure 4B:
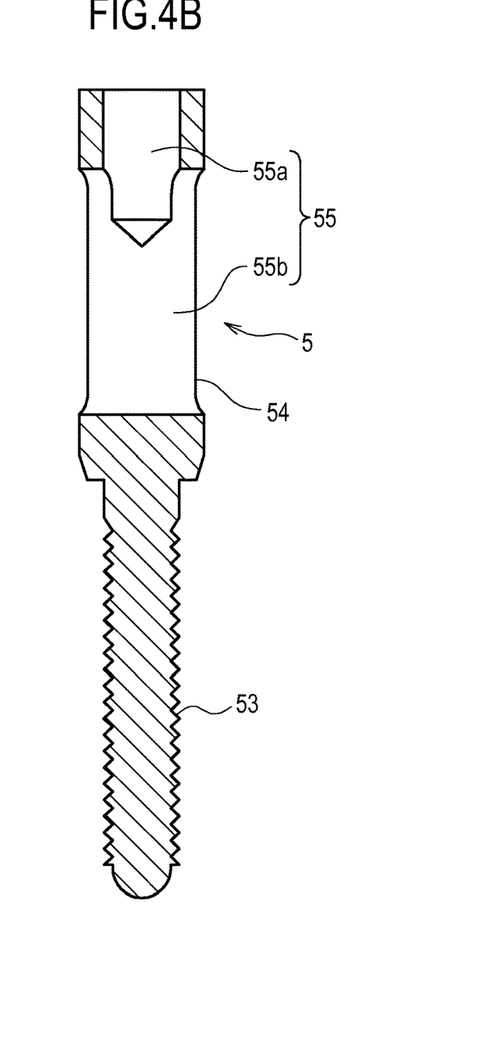
FIG. 4B is a sectional view taken along an X-X line in FIG. 4A.
Figure 4C:
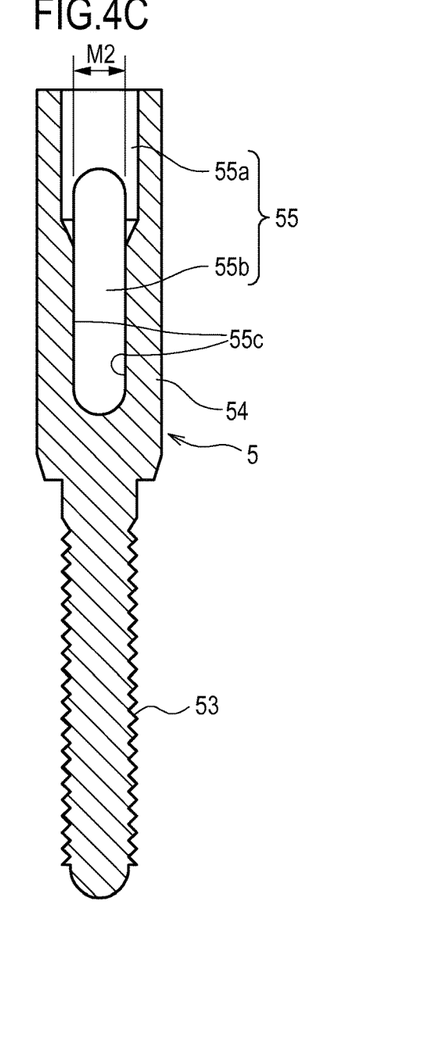
FIG. 4C is a sectional view taken along a Y-Y line in FIG. 4A.
Figure 5A:
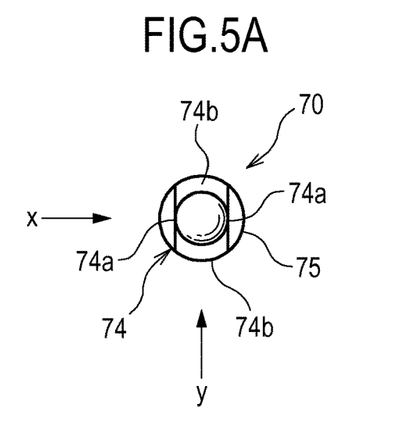
FIG. 5A is a bottom view showing a shaft of the joint structure according to an embodiment of this invention.
Figure 5B:
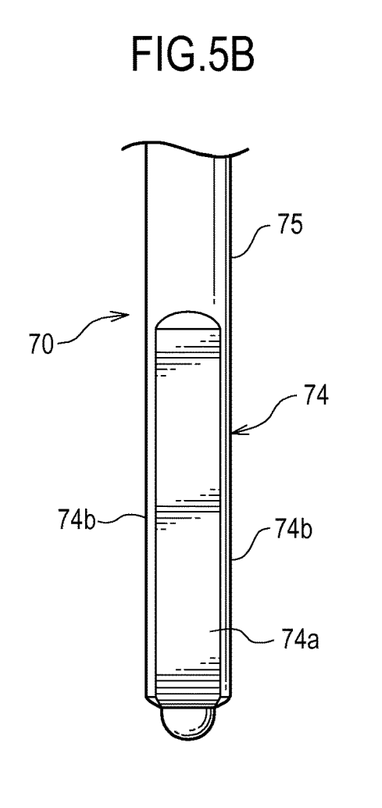
FIG. 5B is a side view showing the shaft of the joint structure according to an embodiment of this invention from an X direction in FIG. 5A.
Figure 5C:
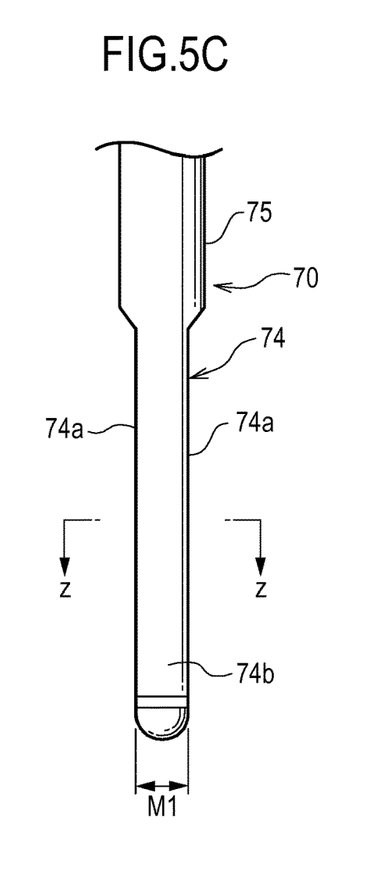
FIG. 5C is a side view showing the shaft of the joint structure according to an embodiment of this invention from a Y direction in FIG. 5A.
Figure 5D:
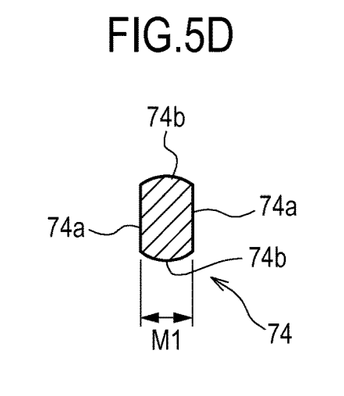
FIG. 5D is a sectional view taken along a Z-Z line in FIG. 5C.

As shown in FIG. 4, the adjuster 5 includes the bolt portion 53, which has a screw formed on an outer periphery thereof and is screwed to the needle valve 4 by a tip end portion thereof, and an external force input portion 54 which is provided to extend from the bolt portion 53 coaxially therewith and into which an external force is input through the shaft 70. The adjuster 5 holds the needle valve 4 via the bolt portion 53.

The external force input portion 54 includes the insertion groove 55 into which the insertion portion 74 of the shaft 70 is inserted, and an outer periphery thereof contacts an inner periphery of the adjuster holding portion 52 to be capable of sliding thereon.

The bolt portion 53 is screwed through the base portion 51 of the adjuster case 50 and coupled to the needle valve 4. Hence, when the rotation of the shaft 70 is transmitted to the external force input portion 54, the adjuster 5 is guided by the adjuster case 50 while rotating so as to move in the axial direction.

As shown in FIGS. 3 and 4, the insertion groove 55 of the adjuster 5 includes an axial hole 55a that is formed to open onto an end surface of the external force input portion 54 and coincides with the pair of arc-shaped side faces 74b of the shaft 70, and a radial hole 55b that is formed to penetrate the external force input portion 54 in the radial direction and coincides with the pair of planar side faces 74a of the shaft 70.

An inner peripheral surface of the axial hole 55a is formed in a shape that perfectly matches the pair of arc-shaped side faces 74b of the shaft 70. In other words, a radius of curvature of the inner peripheral surface of the axial hole 55a is formed to be substantially identical to a radius of curvature of the pair of arc-shaped side faces 74b.

The radial hole 55b is formed at a predetermined length in the axial direction of the external force input portion 54, and does not open onto the end surface of the external force input portion 54. An inner plane 55c of the radial hole 55b is formed in a shape that perfectly matches the pair of planar side faces 74a of the shaft 70. In other words, a width dimension M2 of the radial hole 55b is formed to be substantially identical to a dimension M1 (see FIG. 5) of the width across flat of the pair of planar side faces 74a.

The axial hole 55a and the radial hole 55b are formed such that respective parts thereof intersect. More specifically, a bottom portion of the axial hole 55a and an end portion of the radial hole 55b are formed to overlap.

When the insertion portion 74 of the shaft 70 is inserted into the insertion groove 55 of the adjuster 5, the pair of arc-shaped side faces 74b of the insertion portion 74 are held by the axial hole 55a and the pair of planar side faces 74a are held by the radial hole 55b. As a result, the shaft 70 and the adjuster 5 are joined. An entire outer periphery of the insertion portion 74 is supported by the external force input portion 54 of the adjuster 5, and therefore the insertion portion 74 is prevented from rattling in the insertion groove 55. Hence, when the shaft 70 is driven to rotate by inputting an electric signal into the actuator 7, the rotation thereof is transmitted reliably to the adjuster 5 such that the adjuster 5 moves in the axial direction while rotating.

The insertion groove 55 can be formed by performing inner diameter processing in the axial direction from the end surface of the external force input portion 54 and fashioning a hole that penetrates a trunk portion of the external force input portion 54 in the radial direction, and therefore processing is easy. Hence, the insertion portion 74 and the insertion groove 55 constituting the joint structure are structured simply.

In FIGS. 3 and 4, a bottom surface of the axial hole 55a is formed in a conical shape. However, the bottom surface of the axial hole 55a is not limited to a conical shape, and the shape thereof may be selected appropriately.

Further, in FIGS. 3 and 4, upper and lower end portions of the radial hole 55b opening onto the trunk portion of the external force input portion 54 are formed in an arc shape. However, as long as the radial hole 55b is shaped such that the inner plane 55c thereof perfectly matches the pair of planar side faces 74a of the shaft 70, the upper and lower end portions of the radial hole 55b may be formed in a rectilinear shape. In other words, the external force input portion 54 may be formed with a rectangular cross-section.

Furthermore, the insertion portion 74 of the shaft 70 is not limited to a shape constituted by the pair of planar side faces 74a and the pair of arc-shaped side faces 74b, and the shape thereof may be selected appropriately. Likewise, the shapes of the axial hole 55a and the radial hole 55b constituting the insertion groove 55 may be selected appropriately in accordance with the shape of the insertion portion 74. For example, the insertion portion 74 may be provided with a pair of planar portions instead of the pair of arc-shaped side faces 74b such that the insertion portion 74 is formed with a rectangular cross-section. In this case, the insertion groove 55 should be formed with a hole having a rectangular inner peripheral surface instead of the axial hole 55a.

Next, referring to FIG. 2, the actuator 7 that drives the adjuster 5 will be described.

The actuator 7 includes an actuator main body 72 that is supported by a housing 71 fixed to the cap member 10, an actuator base portion 73 that projects from the actuator main body 72 and is inserted into an actuator holding groove 14 of the cap member 10, and the shaft 70, which projects from the actuator base portion 73 and is driven to rotate by an external force.

The actuator 7 is connected to a control device such as an ECU (Engine Control Unit) of the motorcycle via a cable that is connected to a connector provided on a side face of the actuator main body 72.

The control device initiates an automatic operation of the adjuster 5 by outputting an electric signal to the actuator 7 on the basis of information detected by detectors such as a speed sensor and an acceleration sensor provided on the motorcycle. As a result, the damping force generated by the front fork 100 can be adjusted automatically. Alternatively, an electric signal may be output to the actuator 7 through a manual operation performed by a rider. Further, the actuator 7 may be constituted by a solenoid.

The actuator main body 72 is covered by the housing 71, which is fixed to an end surface of the cap member 10 via a bolt, and disposed on an upper end surface of the cap member 10.

An annular vibration absorption member 80 is interposed between the actuator main body 72 and the housing 71. The vibration absorption member 80 absorbs an impact acting on the actuator 7 via the piston 32, the rod 31, and the cap member 10 when the vehicle wheel is thrust upward by an irregularity on the road surface. The vibration absorption member 80 is formed from rubber or an elastic synthetic resin, and therefore friction generated by the vibration absorption member 80 halts the rotation of the actuator 7.

A gap is provided between an outside surface of the actuator main body 72 and an inside surface of the housing 71. Hence, the housing 71 can fix the actuator 7 on the cap member 10 even when the actuator 7 is shifted in the radial direction for the purpose of alignment, as will be described below.

An annular alignment member 81 is provided on an outer periphery of the actuator base portion 73. The alignment member 81 is disposed to envelop the actuator base portion 73 such that a gap exists between an outer periphery thereof and an inner periphery of the actuator holding groove 14. Using this gap, the actuator 7 can be shifted in the radial direction and thereby aligned such that the adjuster 5 and the shaft 70 are disposed coaxially. Hence, the actuator 7 can be shifted in the radial direction and thereby aligned even when the insertion portion 74 of the shaft 70 is inserted into the insertion groove 55 of the adjuster 5 such that radial direction movement thereof is restricted. Therefore, when the shaft 70 rotates, there is no danger of axial deviation between the adjuster 5 and the shaft 70, leading to an increase in friction between the two components, and as a result, damping force adjustment can be performed smoothly.

The embodiment described above exhibits the following actions and effects.

The entire outer periphery of the insertion portion 74 of the shaft 70 is supported by the axial hole 55a and the radial hole 55b in the insertion groove 55 of the adjuster 5, and therefore the insertion portion 74 is prevented from rattling in the insertion groove 55. Hence, the rotation of the shaft 70 can be transmitted reliably to the adjuster 5 that adjusts the opening of the needle valve 4.

Further, the insertion portion 74 and the insertion groove 55 constituting the joint structure for joining the shaft 70 to the adjuster 5 are structured simply and can therefore by processed easily.

This invention is not limited to the embodiment described above, and may be subjected to various modifications within the scope of the technical spirit thereof.

For example, in the above embodiment, a case in which the joint structure according to this invention is applied to a damping force adjustment mechanism that adjusts a damping force generated by a front fork was described. However, the joint structure according to this invention is not limited thereto, and may be applied to a damping force adjustment mechanism for a reaction unit or another hydraulic shock absorber.

Further, the joint structure according to this invention is not limited to application to a hydraulic shock absorber, and may be applied to any structure for joining an insertion shaft that is driven to rotate and a reception side shaft to which a rotation of the insertion shaft is transmitted. More specifically, this invention may be applied to any structure for joining a shaft that is driven to rotate by an actuator to an adjuster that adjusts an opening of a valve provided in a passage through which a fluid passes.

Furthermore, in the above embodiment, a case in which the insertion portion 74 of the shaft 70 is constituted by two pairs of side face portions including the pair of planar side faces 74a and the pair of arc-shaped side faces 74b was described. However, the insertion portion 74 may be constituted by three or more pairs of side face portions. For example, when the insertion portion 74 is constituted by three pairs of side face portions, two radial holes 55b should be provided in the insertion groove 55. In other words, the number of radial holes 55b should be set in accordance with the number of side face portions.

Moreover, in the above embodiment, the fork main body of the front fork 100 was described as having an inverted form wherein the outer tube 1 serves as the vehicle body side tube and the inner tube 2 serves as the vehicle wheel side tube. However, the fork main body may have an upright form in which the outer tube 1 serves as the vehicle wheel side tube and the inner tube 2 serves as the vehicle body side tube.

The invention claimed is:

1. A joint structure that joins an insertion shaft that is driven to rotate to a reception side shaft having an insertion groove into which the insertion shaft is inserted so that a rotation of the insertion shaft is transmitted to the reception side shaft, the joint structure comprising:
    a pair of opposing arc-shaped portions included at the insertion shaft, the pair of opposing arc-shaped portions being formed on an outer periphery of the insertion shaft; and
    a pair of opposing planar portions included at the insertion shaft, the pair of opposing planar portions being formed on the outer periphery of the insertion shaft;
    the insertion groove including:
        an axial hole that is formed to open roundly onto only one end surface of the reception side shaft and coincides with the pair of arc-shaped portions; and
        a radial hole that is formed to penetrate the reception side shaft in a radial direction and coincides with the pair of planar portions, the radial hole having a width;
        wherein the radial hole is formed such that a first distance across its width is substantially identical to a second distance from a surface of one of the pair of planar portions to a surface of another one of the pair of planar portions, the first distance being in a direction perpendicular to a longitudinal axis of the reception side shaft, the second distance being in a direction perpendicular to a longitudinal axis of the insertion shaft;
    a radius of curvature of an entire inner peripheral surface of the axial hole that is substantially identical to a radius of curvature of the pair of arc-shaped portions; and
    a bottom portion of the axial hole and an end portion of the radial hole overlapping with each other.

2. The joint structure as defined in claim 1, wherein the pair of arc-shaped portions are formed as a continuation of the pair of planar portions and on an identical circumference to each other.

3. The joint structure according to claim 1, further comprising a case to which the reception side shaft is screwed and which holds the reception side shaft to be capable of moving in an axial direction,
wherein the reception side shaft is guided by the case to move in the axial direction when the insertion shaft rotates.

4. The joint structure as defined in claim 3, wherein the reception side shaft is an adjuster that adjusts an opening of a valve provided in a passage through which a fluid passes,
the insertion shaft is a shaft that is driven to rotate by an actuator, and
the opening of the valve is adjusted by driving the shaft to rotate using the actuator such that the adjuster is driven.

5. A hydraulic shock absorber that is interposed between a vehicle body and a vehicle axle to suppress variation in a vehicle body attitude, comprising:
an expansion and contraction member that includes a reservoir chamber partially filled with a gas, and performs an expansion and contraction operation; and
a damper provided in the expansion and contraction member to generate a damping force in accordance with the expansion and contraction operation of the expansion and contraction member,
wherein the damper includes:
a piston that is disposed in a cylinder to be free to slide and delimits an interior of the cylinder into an expansion side chamber and a contraction side chamber;
a rod formed such that a base end side thereof is fixed to a vehicle body side tube constituting the expansion and contraction member and the piston is fixed to a tip end side thereof;
a base member that is fixed to a bottom portion side of the cylinder and separates the reservoir chamber from the contraction side chamber;
a first port formed in the piston to connect the expansion side chamber to the contraction side chamber;
a second port formed in the base member to connect the reservoir chamber to the contraction side chamber;
a damping force generation portion that is provided in at least one of the first port and the second port and generates a damping force by applying resistance to a working fluid passing through the first port and the second port; and
a damping force adjustment mechanism that adjusts the damping force generated by the damping force generation portion,
the damping force adjustment mechanism including:
a passage partially formed in the rod so as to bypass the damping force generation portion;
a valve provided in the passage;
an adjuster that adjusts an opening of the valve;
an actuator that drives the adjuster; and
the joint structure as defined in claim 4, which joins the shaft that is driven to rotate by the actuator to the adjuster, and
by adjusting the opening of the valve, the damping force generated by the damping force generation portion is adjusted.

6. The hydraulic shock absorber as defined in claim 5, further comprising a control device connected to the actuator,
wherein the control device operates the adjuster by outputting a signal to the actuator.

7. A joint structure that joins an insertion shaft that is driven to rotate to a reception side shaft having an insertion groove into which the insertion shaft is inserted so that a rotation of the insertion shaft is transmitted to the reception side shaft, the joint structure comprising:
a plurality of pairs of opposing side face portions that are formed on an outer periphery of the insertion shaft;
wherein the insertion groove includes:
an axial hole that is formed to open onto an end surface of the reception side shaft and coincides with a pair of first side face portions of the side face portions; and
a radial hole that is formed to penetrate the reception side shaft in a radial direction and coincides with a pair of second side face portions of the side face portions;
wherein the axial hole and the radial hole are formed such that respective parts thereof intersect;
wherein a case to which the reception side shaft is screwed and which holds the reception side shaft is capable of moving in an axial direction; and
wherein the reception side shaft is guided by the case to move in the axial direction when the insertion shaft rotates.

8. The joint structure as defined in claim 7, wherein the reception side shaft is an adjuster that adjusts an opening of a valve provided in a passage through which a fluid passes,
the insertion shaft is a shaft that is driven to rotate by an actuator, and
the opening of the valve is adjusted by driving the shaft to rotate using the actuator such that the adjuster is driven.

9. A hydraulic shock absorber that is interposed between a vehicle body and a vehicle axle to suppress variation in a vehicle body attitude, comprising:
an expansion and contraction member that includes a reservoir chamber partially filled with a gas, and performs an expansion and contraction operation; and
a damper provided in the expansion and contraction member to generate a damping force in accordance with the expansion and contraction operation of the expansion and contraction member,
wherein the damper includes:
a piston that is disposed in a cylinder to be free to slide and delimits an interior of the cylinder into an expansion side chamber and a contraction side chamber;
a rod formed such that a base end side thereof is fixed to a vehicle body side tube constituting the expansion and contraction member and the piston is fixed to a tip end side thereof;
a base member that is fixed to a bottom portion side of the cylinder and separates the reservoir chamber from the contraction side chamber;
a first port formed in the piston to connect the expansion side chamber to the contraction side chamber;
a second port formed in the base member to connect the reservoir chamber to the contraction side chamber;
a damping force generation portion that is provided in at least one of the first port and the second port and generates a damping force by applying resistance to a working fluid passing through the first port and the second port; and
a damping force adjustment mechanism that adjusts the damping force generated by the damping force generation portion,
the damping force adjustment mechanism including:
a passage partially formed in the rod so as to bypass the damping force generation portion;
a valve provided in the passage;

an adjuster that adjusts an opening of the valve;
an actuator that drives the adjuster; and
the joint structure as defined in claim 8, which joins the shaft that is driven to rotate by the actuator to the adjuster, and
by adjusting the opening of the valve, the damping force generated by the damping force generation portion is adjusted.

10. The hydraulic shock absorber as defined in claim 9, further comprising a control device connected to the actuator,
wherein the control device operates the adjuster by outputting a signal to the actuator.

\* \* \* \* \*